United States Patent [19]

Schultz et al.

[11] 4,359,142

[45] Nov. 16, 1982

[54] IMPELLER LUBRICATION SYSTEM FOR TRANSMISSION POCKET BEARING

[75] Inventors: Donald C. Schultz, Toledo, Ohio; Charles R. Jones, Ottawa Lake, Mich.

[73] Assignee: Dana Corporation, Toledo, Ohio

[21] Appl. No.: 10,441

[22] Filed: Feb. 8, 1979

[51] Int. Cl.³ .............................................. F01M 9/06
[52] U.S. Cl. ................................ 184/11 R; 184/6.12; 74/467
[58] Field of Search ............... 184/11 R, 13 R, 11 A, 184/11 B, 6.12, 6; 74/467

[56] References Cited

U.S. PATENT DOCUMENTS

| | | | |
|---|---|---|---|
| 1,032,724 | 7/1912 | Adams | 74/467 X |
| 1,749,247 | 3/1930 | Graham | 184/11 R |
| 1,794,921 | 3/1931 | Ramsey | 184/11 R |
| 2,489,699 | 11/1949 | Clark | 184/11 R |
| 2,615,533 | 10/1952 | Cliborn | 184/11 R |
| 2,797,771 | 7/1957 | Orr | 184/11 R |
| 2,984,122 | 5/1961 | Woolley | 74/467 X |
| 3,223,196 | 12/1965 | Stott | 184/6 |
| 3,635,311 | 1/1972 | Kaufman | 184/11 A |
| 3,650,353 | 3/1972 | Abbott | 184/6.12 |
| 4,221,279 | 9/1980 | Jones et al. | 74/467 X |

Primary Examiner—David H. Brown
Attorney, Agent, or Firm—Frank B. McDonald

[57] ABSTRACT

An impeller lubrication system provides lubrication oil flow to a transmission pocket bearing. Splash and spray lubrication oil is directed from the transmission casing to a collector region along a shaft adjacent the pocket bearing. As the shaft rotates, oil is forced axially along the shaft by an impeller fixed to the shaft. The impeller forces the oil from the collector region to the pocket bearing through a lubrication port in the shaft.

7 Claims, 5 Drawing Figures

IMPELLER LUBRICATION SYSTEM FOR TRANSMISSION POCKET BEARING

TECHNICAL FIELD

This invention relates to bearing lubrication, and more particularly to the lubrication of transmission pocket bearings.

BACKGROUND ART

In a standard transmission, a mainshaft is journalled to an input shaft via a pocket bearing. The latter bearing has been traditionally difficult to lubricate because of its relatively concealed position within a bore in the end of the input shaft.

Conventional devices for providing pocket bearing lubrication have included port holes, grease packs, oil slingers, and hydraulic pumps. Port holes generally are machined radially through transmission input shafts for ducting oil inwardly to pocket bearings. Grease packs are simply large masses of grease in which pocket bearings are packed during assembly of transmissions. Oil slingers and hydraulic pumps involve mechanical pumping actions for providing forced oil flow to pocket bearings.

Port holes have been found deficient in high speed lubrication of transmission input shafts because oil travels inwardly to the pocket bearings only during slow rotation or stoppage of the shaft. At high rotation speeds, centrifugal force throws the oil outwardly rather than inwardly through the port holes, thus starving the bearing at high speeds when lubrication becomes more critical.

Grease packs have been successful at low speeds and under low loading conditions. However, under increased speed and loading conditions grease packs deteriorate rapidly and are, therefore, unsuitable for long-term bearing lubrication.

Operationally, oil slingers and hydraulic pumps have been more successful than port holes and grease packs. However, slingers have tended to be less efficient in the high speed-high load conditions of today's heavy duty transmissions and most hydraulic pumps are generally considered too complex and expensive as a feasible alternative.

DISCLOSURE OF THE INVENTION

The invention disclosed and claimed herein provides a relatively inexpensive, but very effective, transmission pocket bearing lubrication system. A preferred embodiment of this invention includes a stationary annular oil baffle mounted against the transmission input shaft support bearing between the latter bearing and an external bearing cap. The baffle and the bearing cap form an oil passageway through which transmission splash and spray oil is diverted around the support bearing to a collector region along the input shaft. Along the collector region, a centrifugal oil impeller is fixed to the input shaft and rotates therewith. A lubrication port extends through the input shaft bearing hub from the collector region to the pocket bearing. As the shaft rotates, oil is axially forced from the collector region by the impeller through the adjoining lubrication port and into the pocket bearing. A portion of the oil flows outwardly from the collector region to the support bearing instead of being forced into the pocket bearing by the impeller.

DETAILED DESCRIPTION OF PREFERRED EMBODIMENTS

Figure 1:
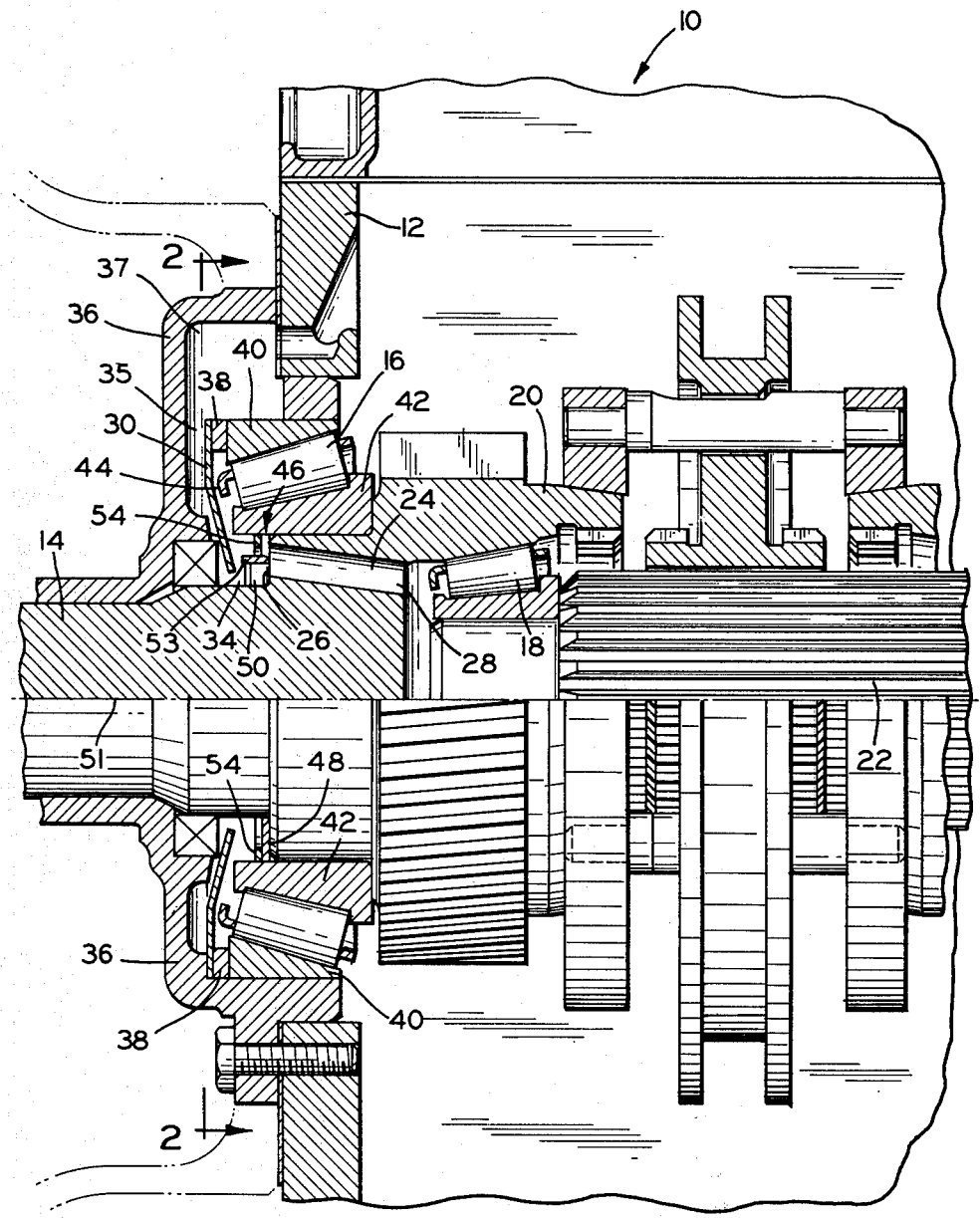
FIG. 1 is an elevation side view in section of a transmission having the pocket bearing lubrication system of this invention.
Figure 2:
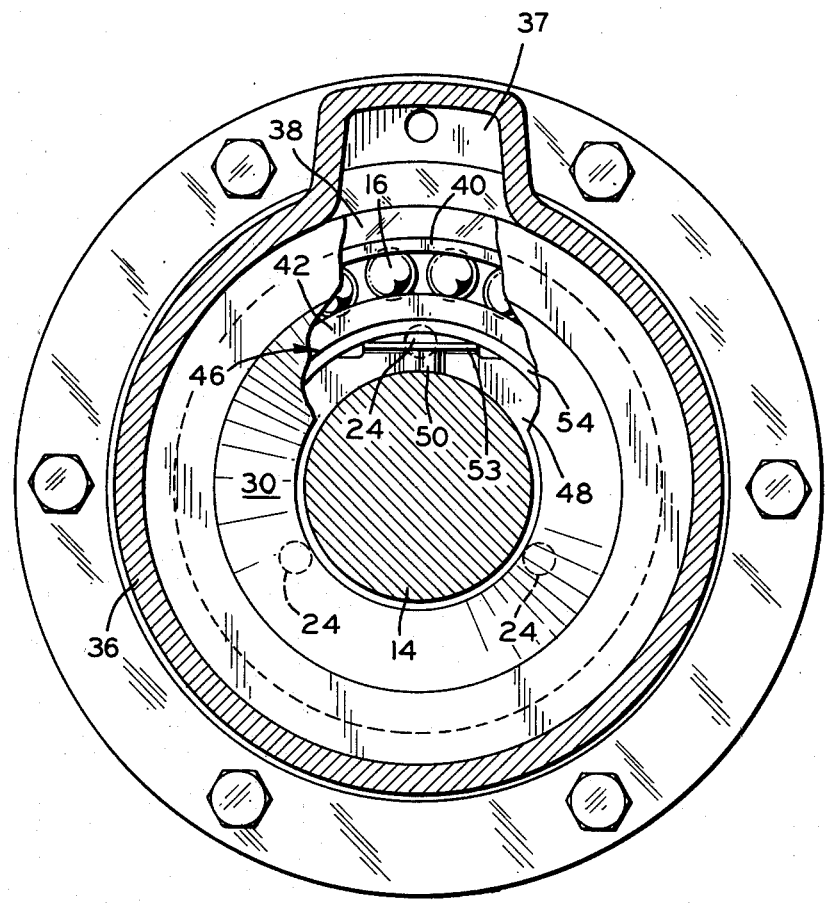
FIG. 2 is a sectional view along line 2—2 of FIG. 1.

FIGS. 1 and 2 depict a preferred embodiment of the transmission pocket bearing lubrication system of this invention. A vehicular transmission 10 includes a housing 12 which contains a rotary input shaft 14. The input shaft is journalled in a support bearing 16, and contains a pocket bearing 18 at the bearing hub end 20 for supporting a splined rotary mainshaft 22 axially aligned therewith.

Three pocket bearing lubrication ports 24 extend through the bearing hub end 20 of the input shaft 14. The ports 24 are spaced 120° about the hub, and have entrances 26 proximal to the support bearing 16, and exits 28 proximal to the pocket bearing 18, as shown.

A stationary oil baffle 30 is positioned against the support bearing 16. The baffle 30 diverts splash and spray oil around the bearing 16 to a collector region 34 along the shaft and inwardly of the bearing 16. The baffle is positioned between the bearing 16 and a bearing cap 36, the baffle and bearing cap forming a passageway 35 for lubrication oil to flow into the collector region 34. A splash and spray trough 37 acts as a reservoir for the collection of splash and spray oil thrown by the transmission gears and the ducting thereof into the passageway 35. An annular spacer 38 is positioned intermediate the baffle 30 and the outer race 40 of the bearing 16 to assure proper clearance between the baffle and the rotating inner race and cage, 42 and 44 respectively, of the bearing 16.

Figure 4:
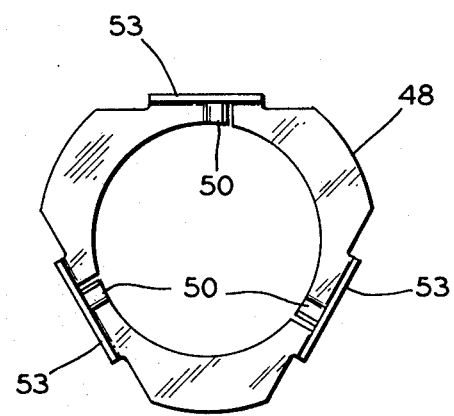
FIGS. 4 and 5 are face and side views respectively of the impeller of FIGS. 1, 2, and 3.
Figure 5:
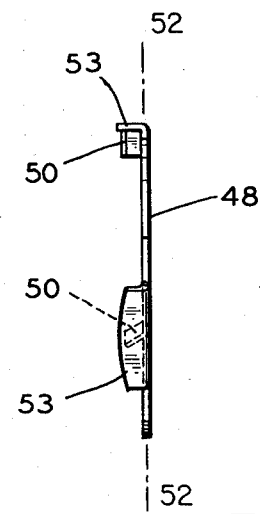

An annular oil impeller 46 is affixed to the input shaft 14 in abutting relationship with the port entrance 26. From the collector region 34, oil is axially forced by the impeller through the lubrication port 24 into the pocket bearing 18. A portion of the oil is centrifugally thrown outwardly of the collector region 34 by the rotation of shaft 14, thus lubricating the support bearing 16. The impeller 46 is shown in FIGS. 4 and 5. It is comprised of an annular plate 48 in which oil deflector tabs 50 have been formed. The tabs 50 are angled from plane 52—52 as more clearly shown in FIG. 5. Formation and angling of tabs 50 may be achieved by conventional die techniques. The impeller 46 is assembled onto shaft 14 so that the three tabs 50 are aligned with the lubrication port entrances 26, as depicted in FIG. 1. Lips 53 abut tabs 50 at right angles (FIG. 4) to form baffles therewith for the restriction of radially directed oil flow, which markedly increases the axial flow efficiency of the impeller. A snap ring 54 holds the impeller is abutting relationship with the port entrance 26 as shown in FIG. 1.

Figure 3:
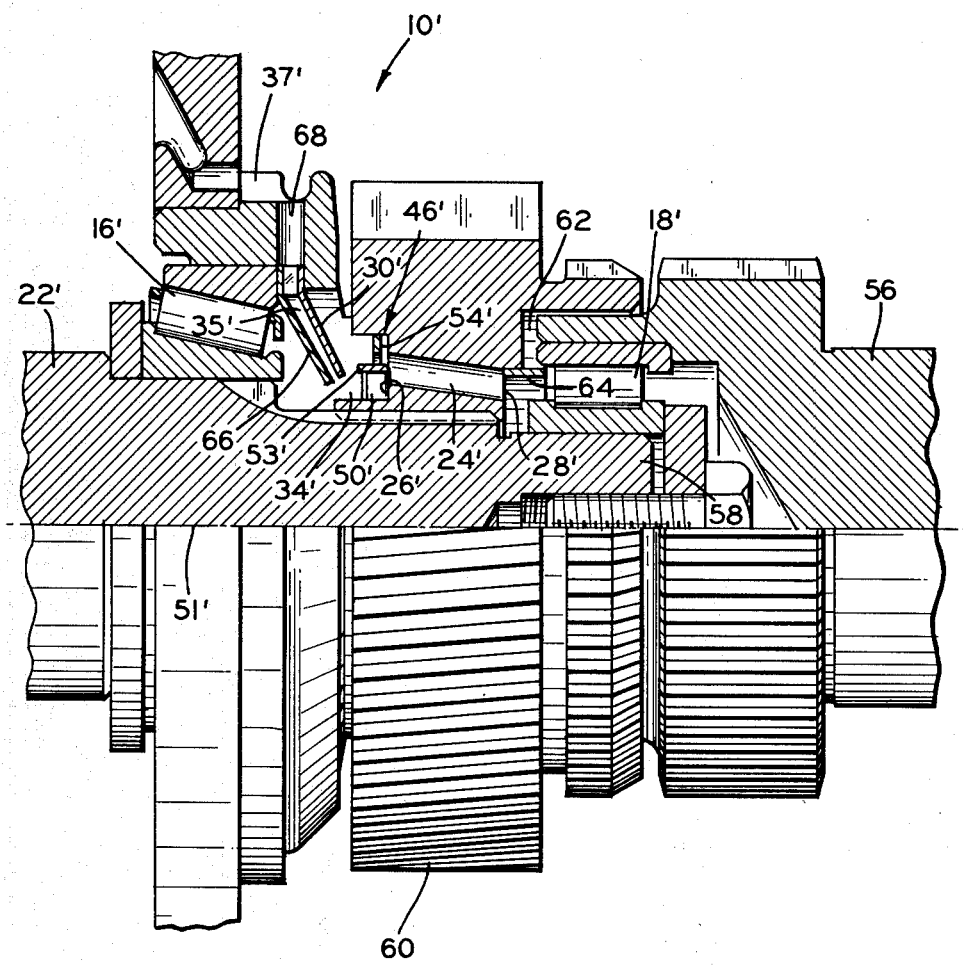
FIG. 3 is a partial side view in section of an alternate embodiment of this invention as used in conjunction with a compound transmission.

FIG. 3 depicts a second embodiment of the transmission pocket bearing lubrication system of this invention. A compound transmission 10' includes a rotary mainshaft 22' journalled in a support bearing 16'. An output shaft 56 is axially aligned with the mainshaft 22' and includes a pocket bearing 18' in which the end 58 of the mainshaft 22' is journalled. In this latter embodiment, however, the lubrication port 24' extends through an auxiliary input gear 60 splined to the mainshaft 22', with exit 28' spaced from the pocket bearing 18' by gap 62. An annular oil collar 64 is provided to bridge the gap 62, hence restricting the oil from flowing into the gap 62 upon leaving the port exit 28, thus ensuring that upon leaving the port exit 28', the oil flows directly into the pocket bearing 18'. The lubrication port 24' of this embodiment extends through a gear on the shaft rather than through the bearing hub of the shaft as in the first embodiment. For purposes of this invention, however, the input gear 60 is defined as a radially extending portion of the shaft 22; so that in either embodiment the lubrication port may be said to extend through a shaft.

As in the first embodiment, a stationary annular oil baffle 30' is used to direct oil to collector region 34'. However, the system of FIG. 3 also includes a second stationary annular oil baffle 66 adjacent the baffle 30' for the purpose of providing passageway 35' for splash and spray oil from an oil inlet 68 which adjoins the splash and spray trough 37'. The oil baffle 66 in this regard serves the same function as the bearing cap 36 of the first embodiment.

Aside from the foregoing modifications, all of the principles applicable to the first embodiment apply to the second embodiment.

What is claimed is:

1. In a transmission having a first shaft, a pocket bearing contained within said first shaft, and a second shaft journalled within said pocket bearing; an improvement comprising an impeller lubrication system for said pocket bearing, said system having:
   (a) an oil collector region adjacent one of said shafts;
   (b) at least one lubrication port through said one of said shafts, said port having an entrance in communication with said oil collector region and an exit in communication with said pocket bearing;
   (c) an impeller fixed to said one of said shafts at said collector region and in communication with the entrance of said port for axially forcing oil through said port to said pocket bearing, said impeller having at least on oil deflector tab lined with said entrance; and
   (d) a lip positioned radially outwardly of said oil deflector tab, said lip abutting said tab at a substantially right angle.

2. The impeller lubrication system of claim 1 further comprising an oil collar adjacent to said port exit, said collar extending into said pocket bearing so as to conduct lubrication from said port to said pocket bearing.

3. The impeller lubrication system of claim 1 wherein said means for providing lubrication oil to the collector region comprises a stationary oil baffle.

4. The impeller lubrication system of claim 3 further comprising a second stationary annular oil baffle, which with said first baffle defines a passageway for conducting said lubricating oil to said collector region.

5. The impeller lubrication system of claim 3 wherein said means for providing lubrication oil to the collector region further comprises a splash and spray trough and a passageway, wherein said splash and spray trough leads to said passageway and said passageway leads to said collector region.

6. The impeller lubrication system of claim 5 wherein a portion of said oil is thrown radially of said collector region and into a shaft support bearing by centrifugal force.

7. The impeller lubrication system of claim 6 wherein said passageway is defined by a bearing cap and said stationary oil baffle.

* * * * *